United States Patent
Benedict et al.

(10) Patent No.: US 9,442,801 B2
(45) Date of Patent: Sep. 13, 2016

(54) PLATFORM ERROR CORRECTION

(71) Applicant: Hewlett-Packard Development Company, L.P., Houston, TX (US)

(72) Inventors: Melvin K. Benedict, Magnolia, TX (US); Lidia Warnes, Roseville, CA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 82 days.

(21) Appl. No.: 14/498,616

(22) Filed: Sep. 26, 2014

(65) Prior Publication Data

US 2016/0092306 A1 Mar. 31, 2016

(51) Int. Cl.
*G06F 11/00* (2006.01)
*G06F 11/10* (2006.01)

(52) U.S. Cl.
CPC .................. *G06F 11/1076* (2013.01)

(58) Field of Classification Search
CPC ........... G06F 11/1048; G06F 11/1008; G06F 11/1044; G06F 11/1072; G06F 11/1004; G06F 11/10; G06F 3/0619; G06F 11/076; G06F 11/14; G06F 11/102; G06F 11/1028; G06F 11/1064; G06F 21/64; G06F 11/07; G06F 11/1016; G06F 11/106
USPC ......... 714/751, 764, 704, 774, 718, 799, 52, 714/746, 767, E11.052, E11.043; 365/236; 711/119, 171, 172
See application file for complete search history.

(56) References Cited

U.S. PATENT DOCUMENTS

| | | | |
|---|---|---|---|
| 5,127,014 A | 6/1992 | Raynham | |
| 6,279,128 B1* | 8/2001 | Arnold | G06F 21/567 714/49 |
| 7,493,531 B2 | 2/2009 | Ito et al. | |
| 8,161,356 B2 | 4/2012 | Bains et al. | |
| 8,392,779 B2* | 3/2013 | Schneider | G06F 11/1004 323/315 |
| 8,495,467 B1 | 7/2013 | Billing et al. | |
| 8,640,005 B2 | 1/2014 | Wilkerson et al. | |
| 2009/0271678 A1* | 10/2009 | Schneider | G06F 11/1004 714/746 |

OTHER PUBLICATIONS

Chris Wilkerson et al., "Reducing Cache Power with Low-Cost, Multi-bit Error-Correcting Codes," ISCA'10, Jun. 19-23, 2010, Saint Malo, France, pp. 1-11, ACM, Available at: <pages.cs.wisc.edu/~alaa/papers/isca10_refresh.pdf>.

Manu Awasthi et al., "Efficient Scrub Mechanisms for Error-Prone Emerging Memories," Research Paper, Jan. 19, 2012, pp. 1-12, Available at: <cs.utah.edu/~rajeev/pubs/hpca12a.pdf>.

* cited by examiner

*Primary Examiner* — Phung M Chung

(74) *Attorney, Agent, or Firm* — Hewlett Packard Enterprise Patent Department

(57) ABSTRACT

An example device includes a first error corrector to perform platform error correction based on a stride length. A memory includes a second error corrector that is to perform on-memory error correction that is to be disabled for platform error correction.

18 Claims, 5 Drawing Sheets

PLATFORM ERROR CORRECTION

BACKGROUND

Over time, memory technology has experienced increases in storage density, associated with reductions in feature sizes. As a result, issues that previously may have caused second-order and/or third-order effects at lower densities, may begin to cause primary-order effects at higher densities. For example, memory cell storage reliability at reduced feature sizes/higher density may increase a need for more frequent refreshing/scrubbing of stored data, reducing overall efficiency of memory storage subsystems.

BRIEF DESCRIPTION OF THE DRAWINGS/FIGURES

DETAILED DESCRIPTION

Periodic refreshing of data in a memory system has previously been used to accommodate decreases in memory feature sizes. However, a need for more frequent data refreshing may create performance issues, e.g., by using additional computational resources (e.g., address/command bus bandwidth, processing cycles, time, and power) to perform memory scrubbing operations and additional refresh commands. Processing bus cycles used during memory scrubbing operations are unavailable for use by other programs, and the more processing resources devoted to memory scrubbing, the greater the potential performance implication to overall system efficiency. Memories that are to be scrubbed may include an on-die error correction code (ECC) capability, for correcting some errors independent of a global/platform memory scrub initiated off-die (e.g., by a system memory controller). However, operation of such on-die ECC may cause issues with the operation of the system memory controller of a computing system, which is to access such memory that may be altered by the on-die ECC (e.g., during a background scrubbing operation by the memory controller to remove accumulated errors). Accordingly, example devices and methods described herein may enhance overall performance of systems that perform memory scrubbing, while interacting efficiently with on-die memory ECC solutions.

Examples provided herein may work in conjunction with and take advantage of memories having on-die ECC, to provide reliable system-level solutions to deal with ECC checking and memory scrubbing at multiple levels of a system. For example, a system may use a memory scrubbing stride length suitable for a given memory footprint, by extending a stride length resulting in fewer memory accesses, such as when no memory errors have accumulated and/or when accumulated errors are within the ECC capabilities of the memory's on-die ECC.

Figure 1:
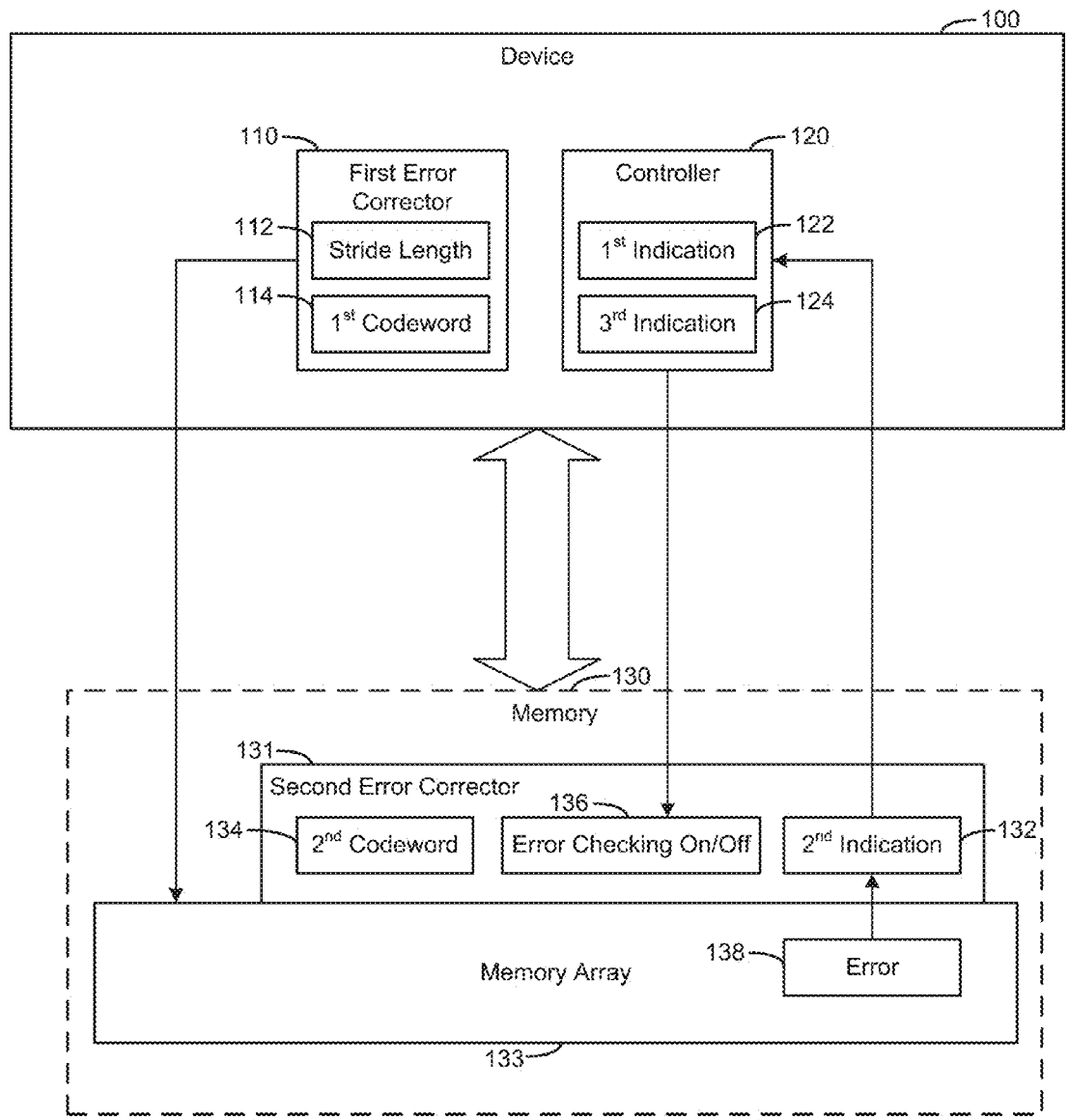
FIG. 1 is a block diagram of a device including a controller according to an example.

FIG. 1 is a block diagram of a device 100 including a controller 120 according to an example. The device 100 also includes a first error corrector 110, which is associated with a stride length 112 and a first codeword 114. The controller 120 is associated with a first indication 122 and a third indication 124. The device 100 is to be coupled to a memory 130, which includes a second error corrector 131 and a memory array 133. The second error corrector 131 is associated with a second codeword 134, error checking 136, and a second indication 132. The memory array 133 is associated with an error 138. As used herein, the term "second indication" corresponds to an error indication as recited in the claims, the term "first indication" corresponds to a disable indication as recited in the claims, and the term "third indication" corresponds to an enable indication as recited in the claims.

The device 100 is to facilitate multi-level ECC capabilities, between the first error corrector 110 and the second error corrector 131. Having ECC capability on the memory 130 enables correction of data at the memory 130, which is to be potentially read by the device 100. For example, within the die of a memory 130, the second error corrector 131 may correct individual bits associated with a small portion of the memory array 133 read by the controller 120 of the device 100. Thus, from a memory controller 120 (i.e., platform) standpoint, a broader region of the memory 130 is visible, from the platform perspective, to apply the first error corrector 110 to any of multiple different memory arrays 133 (multiple being possible, although one is shown in FIG. 1 for simplicity's sake). Thus, device 100 enables and is compatible with multiple levels of memory protection and/or error characteristics, which may include, e.g., bursted vs. non-bursted errors. Such protection provided by device 100 may be enabled in a computing system chipset, for example, to provide chipset-level error correction capability. Device 100 also may provide additional mechanics of accessing a memory 130 and related memory subsystem, such as based on a new type of memory controller 120 and/or associated firmware to drive the memory controller 120 (e.g., as a state machine provided in a memory controller 120).

The controller 120 may interact with a separate processor (not shown in FIG. 1), and/or operate as a processor, to perform various functions. Such functionality may be based on logic (e.g., provided by a computer readable media) to generate and/or interpret indications 122, 124, 132, and so on, and interact with other components such as the first and second error correctors 110, 131. Additional interaction may be such that the controller 120 detects and corrects memory errors, and reports information to (and collects information for) a processor of a computing system (not shown in FIG. 1). A processor may be used separately from the controller 120, and/or processor functionality may be integrated with the controller 120. The controller 120 may report to the processor such that information may be available to an operating system (OS) associated with the processor/computing system. Similarly, the controller 120 may receive instructions and/or may be controlled by the processor/computing system/software to implement the functionality and features as described herein.

The controller 120 may interact with the memory 130 based on multiple codewords (e.g., first codeword 114, second codeword 134), which may be associated with two different locations (device 100 and memory 130). A codeword may be corrected on the device 100 (platform) side and/or on the memory 130 (on-die) side, and the codewords 114, 134 may be of different sizes and comprise different information. A codeword may include a plurality of n-bit symbols, which may be formed from a plurality of n bursts over time from the memory. The codeword may be used to detect and/or correct memory errors. The device 100 may be based on a prefetch buffer architecture, such that a memory access occurs to a row, and a buffer retrieves a set of adjacent datawords on the row and reads them out ("bursts" them) in rapid sequence. For example, in a 4n prefetch buffer, "n" refers to the input/output (I/O) width of a memory chip, multiplied by the burst depth "4" to give the size in bits of the full burst sequence. Thus, an 8n prefetch buffer on an 8-bit wide memory 130 may accomplish a 64-bit transfer based on an ×8 burst of 8 bits.

The memory 130 may be an ECC dual in-line memory module (DIMM) that may include dynamic random access memory (DRAM) chips for storing data, as well as error correction code (ECC). In an example, the memory 130 may be a DIMM having a 72-bit wide data interface, composed of 64 bits of data and 8 bits of ECC. Details of the ECC mechanism may vary based on system designers for different examples, including mechanisms for on-board memory error correction based on the second error corrector 131. In an example, the memory 130 may be any device that may take advantage of on-die ECC capability, such as double data rate fourth generation synchronous dynamic random-access memory (DDR4 SDRAM). In alternate examples, such as where ECC capabilities are provided by a platform memory controller and a memory media controller proximate to the memory 130, any type of memory media 130 may be used. Thus, memory 130 may include discrete/removable memory modules, as well as embedded memory systems.

The device 100 illustrates the first error corrector 110, which may detect and/or correct errors from the device platform/system perspective. Some memory corrections may use single bit-error correcting and double bit-error detecting (SEC-DED) code. For example, an 8-bit SEC-DED code can correct 1-bit errors and detect 2-bit errors. In contrast, the examples provided herein enable the capability of correcting more than one bit, e.g., one bit more than the capability of the second error corrector 131 (or a capability of correcting four random bits, whichever is larger), at the platform level of memory correction by the first error corrector 110.

Error correction by the second error corrector 131 may be based on a generation process that generates a number of error correct (check) characters to be stored with the data, e.g., adding 8 additional characters to a data word of 128 bits to provide single-bit random data protection. When reading that stored data, the error corrector may recreate the check character(s), and compare the recreated characters to the stored check characters read out of storage. If different, the second error corrector 131 has identified an error 138, and may attempt to correct a single bit in error. However, if more than one bit is in error in this example, the second error corrector 131 may provide second indication 132 to indicate that an error 138 has occurred at the memory array 133 that is uncorrectable by the on-die second error corrector 131. The second error corrector 131 may then turn off its error correction, and pass error correction responsibilities to the higher level platform memory controller 120 and/or first error corrector 110, which may then recreate the data using more robust error correction capabilities (e.g., such as those used for memory scrubbing), correct the error 138, and store the data properly. The memory 130 may support the turning on and off of the error checking based on error checking on/off 136, and the controller 120 of device 100 may operate such on/off memory functionality based on first/third indications 122,124, for example. A memory 130 may recognize such control function commands based on, e.g., an on-DRAM register (such as block 136) that may be written to turn on and off error correction at the memory 130.

The device 100 may take advantage of improved system efficiency, in view of the availability of the second error corrector 131, by virtue of the stride length 112 of the first error corrector 110 of the device 100. For example, in an access to memory array 133, a stride length on the second error corrector 131 may be four times as big as the stride length 112 of the first error corrector 110. A stride length may be used for striding through memory data to perform memory scrubbing, whereby a memory location is read, checked for errors, and fixed if appropriate. Thus, for example, based in part on differences between the stride length 112 of the device 100, compared to a stride used by the second error corrector 131 at the memory 130, error checking at the device 100 may rely on the use of additional bits that are sent to the first error corrector 110, compared to those used by the second error corrector 131 for error checking at the memory 130.

The stride length 112, by which the device 100 may stride through the memory array 133, may be increased for improved efficiency, e.g., to match an ECC word size of the memory 130. Thus, the stride length 112 through the memory 130 is not limited to being on a cacheline boundary. The device 100 may recognize (e.g., via various indications) that on-die/on-memory ECC is available (e.g., via second error corrector 131), and may adjust the stride length 112 as appropriate for the memory 130. For example, the stride length 112 used by device 100 may be increased to exceed a length that would otherwise be used for addressing single-bit errors, because the memory 130 would be able to provide such error correction capability for single-bit errors that occur on, and would therefore be corrected by, the memory 130, without a need for the device 100 to service those errors. The stride length 112 also may be increased by virtue of the capability of device 100 to receive a second indication 132 of an uncorrectable event/error. Accordingly, the device 100 may operate with a long stride length 112 by default, and in response to the second indication 132 of error 138 that is uncorrectable by memory 130, the device 100 may go back and do a more detailed scrub (e.g., by adjusting a shorter stride length 112 responsive to the second indication 132) to identify the error 138 and scrub/correct it from a platform perspective operating at heightened granularity due to the shorter stride length.

Thus, example devices 100 may take advantage of the length of time to do a scrub through the memory 130 by increasing the stride length 112. Thus, the stride length 112 may be increased, e.g., to match the second codeword 134 in the memory 130, and is not constrained to a shorter length corresponding to the first codeword 114 associated with a cacheline for the first error corrector 110. In an example, the stride length 112 may be increased by a factor of four, based on the first codeword 114 of 32-bits, versus a second codeword 134 of 128-bits. Accordingly, increasing the stride length 112 results in improved efficiency by saving processor cycles, conserving address bus bandwidth, reducing power requirements, and other benefits. If necessary, the stride length 112 may be adjusted for increased memory scrutiny.

Potential adjustments to the stride length 112 may be implementation specific. As set forth above, the stride length 112 may be increased, e.g., to more quickly scrub a given size of memory 130, and/or reduced, e.g., to perform a detailed scrub if an error 138 is detected. The first error corrector 110 may use a stride length 112 that is optimized for best overall performance in view of an expected number/ frequency of memory errors 138. In the case of an error 138 that needs to be recovered from and corrected by device 100, changes to the stride length 112 may be made on-the-fly (e.g., during operation of the device 100 and/or memory 130, such as during a memory scrubbing operation). The stride length 112 may be reduced for detailed scrubbing even in view of potential design constraints that may be imposed by the memory controller of device 100 (first error corrector 110 and/or controller 120) and how it accesses memory 130. Similarly, the techniques may be employed in view of potential constraints imposed by second error corrector 131, such as a memory stride length used by the second error corrector 131, that may be based on a definition of the memory codeword as defined by the particular manufacturer and/or implementation of the memory 130.

Figure 2:
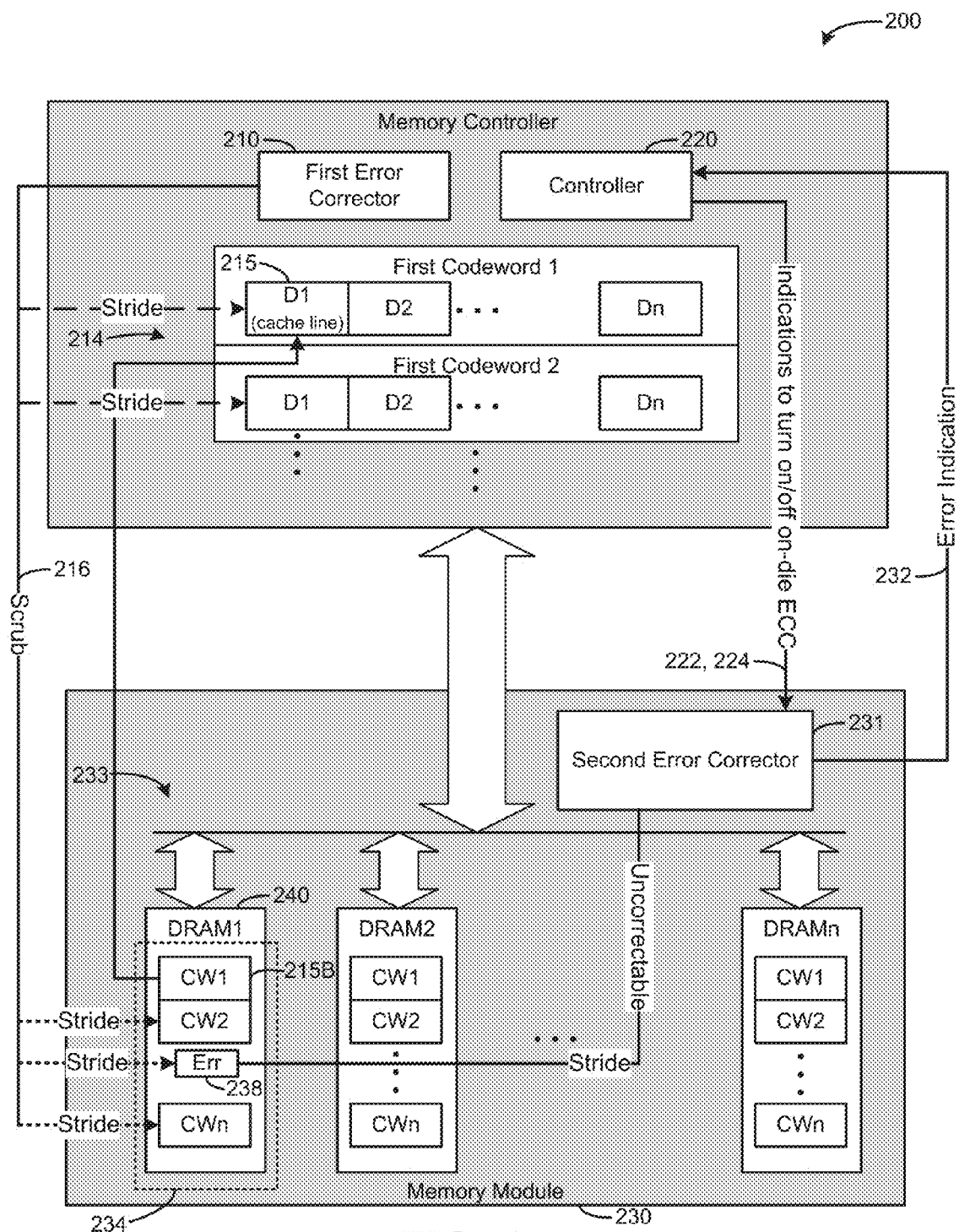
FIG. 2 is a block diagram of a device including a controller according to an example.

FIG. 2 is a block diagram of a device 200 including a controller 220 according to an example. The device 200 also includes a first error corrector 210, and a plurality of first codewords 214 associated with respective cachelines 215. The first error corrector 210 is to scrub 216 the second codewords 234, which include memory cachelines 215B that are to be used to form the first codewords 214 associated with the device 200. The device 200 is coupled to a memory 230.

The memory 230 is associated with second error corrector 231 and a plurality of DRAMs 240 forming a memory array 233. A DRAM 240 is associated with a second codeword 234 including a plurality of memory cachelines 215B, corresponding to the plurality of first codewords 214 and respective cachelines 215 of the device 200. The second error corrector 231 is to receive indications 222, 224 from the controller 220, and the second error corrector 231 is to provide an error indication 232 to the controller 220, in response to the error 238 in the DRAM 240 (e.g., in response to identifying that error 238 is not correctable by the second error corrector 231 located at the memory module 230). Although illustrated as a memory module 230, other types of memories may be used, including non-modular memory that is embedded in a device.

Prefetching may be used by the memory controller (first error corrector 210 and/or controller 220) to retrieve information from the memory module 230 to calculate ECC, based on a number of bits that a DRAM 240 contributes to a cacheline 215. Similarly, internal to the memory module 230, the second error corrector 231 may prefetch a potentially different number of bits from the memory array 233 to calculate ECC for use by the second error corrector 231. For example, it is possible that not all of the bits that are prefetched by the second error corrector 231 in the memory module 230 are to be used in the cacheline 215 of the memory controller, which the device 200 may accommodate efficiently. For example, in the DRAM 240, part of the second codeword 234 that forms the memory cacheline 215B is contributed by the DRAM 240 to the cacheline 215 in a corresponding first codeword 214. More specifically, the second codeword 234 as used by the DRAM 240 and second error corrector 231, may be relatively larger than the first codeword 214 used by the memory controller 220 and first error corrector 210. Thus, a smaller portion of the second codeword 234 may be used to form the first codeword 214 that is used by the controller 220/first error corrector 210 (note that the block diagrams in FIG. 2 are not drawn to relative scale). Thus, the first codeword 214 is formed by a contribution from a plurality of portions of various DRAMs 240, whose data is formed together as the first codeword 214 in the platform memory controller.

Absent the benefits described herein, there could be a discrepancy between the portion of data to be used/corrected by the first error corrector 210/controller 220, in view of data that may or may not have been corrected by the second error corrector 231 of the memory module 230. For example, the second error corrector 231 may detect failed bit(s) at error 238, and may correct those bits (if correctable by the second error corrector 231). However, because the ECC used by the memory controller (first error corrector 210/controller 220) may be based on the second codeword 234, the correction by the second error corrector 231 of the error 238 may result in a modification the second codeword 234 and cause a mismatch with generated error correction information at the first error corrector 210, thereby causing issues at the first error corrector 210. Similar modifications to the second codeword 234 may be caused by the second error corrector 231, even if the error 238 is uncorrectable, that may cause issues at the first error corrector 210. Similarly, operation of the first error corrector 210 may affect data used in the operation of the second error corrector 231.

Example devices and methods described herein may avoid such potential issues, and may increase efficiency. The second error corrector 231 is allowed to correct correctable errors 238 without a need for engaging the first error corrector 210 (e.g., thereby allowing the first error corrector 210 to use a larger stride length for memory scrubs). Additionally, the second error corrector 231 may identify those errors 238 that are not correctable at the DRAM memory module 230 by the second error corrector 231. Accordingly, the second error corrector 231 may provide an error indication 232 to the controller 220, and the controller 220 may provide to the second error corrector 231 an indication 222 to turn off on-die ECC by the second error corrector 231. Accordingly, the second error corrector 231 is suspended from making its own changes to the second codeword 234 or other contents of the memory module 230. The data at the memory module 230 may then be accessed by the memory controller (first error corrector 210 and/or controller 220) to address the error 238, e.g., based on a scrubbing operation by the first error corrector 210. The first error corrector 210 may correct other such errors that may be located at the memory module 230 in various DRAMs 240 or other locations. After the memory controller has completed such scrubbing/corrections to the memory module 230, the controller 220 may provide an indication 224 to turn on the on-die ECC by the second error corrector 231.

Stride lengths used by the first error corrector 210 and the second error corrector 231 may be sized relative to the first codeword 214 of the platform first error corrector 210, and the second codeword 234 of the on-die second error corrector 231. The first codeword 214 of the platform first error corrector 210 may be based on information that is spread across multiple DRAM 240 dies, and the first codeword 214 may be relatively larger than the second codeword 234 on the DRAM die 240 that is used by the second error corrector 231. Also, an amount of data contributed by each DRAM 240 die (e.g., memory cacheline 215B) to the first codeword 214 may be smaller than an amount of data of the entire second codeword 234. Furthermore, it is also possible that not all of the bits that are prefetched in the DRAMs 240 are used in the cachelines, resulting in a potential difference between a number of bits that a DRAM 240 contributes to a cacheline, and a number of bits that are internally prefetched from the DRAM memory array 233 internally by the second error corrector 231 to calculate on-die ECC at the memory module 230. Such factors may be used when adjusting a stride length used by the first error corrector 210 and/or the second error corrector 231.

The first error corrector 210 also may adjust its stride length according to a function of cacheline boundaries, e.g., of the boundaries between memory cachelines 215B of a DRAM 240. The second error corrector 231 may be associated with its own stride length for a DRAM 240, which may vary based on a particular implementation that a memory vendor may use for on-die ECC. Independent of the stride length for the second error corrector 231 of the memory module 230, turning off the on-die ECC via indication 222 enables the first error corrector 210 to resolve issues (e.g., error 238) with the memory module 230. Accordingly, a stride length of the platform first error corrector 210 may be used that does not fall along boundaries of a memory cacheline 215B in the DRAMs 240.

The memory 230 may be a memory module that demonstrates a type of layout of DRAMs 240 (e.g., memory chips of DRAM1, DRAM2, . . . , DRAMn). Thus, where n=9, memory 230 may be a DRAM module based on nine 8-bit DRAM chips to form a 72-bit channel width interface (where 64 bits may be data, and 8 bits may be ECC) in a ×8 ECC memory module configuration. Examples may use other types of DRAMs 240, for example, using ×4, ×16, etc. DRAMs 240 with corresponding changes to a total number of DRAM chips to accomplish the desired channel width, as in DDR3, DDR4, and other types of DRAM chips. DRAM chips of ×32 or other configurations also may be used to enable the disclosed techniques, for example, in other types of memory, such as low power DDR (LPDDR), mobile DDR (mDDR), graphic DDR (GDDR), and other types of memory (including non-volatile and/or embedded memory that is not in the form of a removable memory module). The various types of memories may include on-die ECC, e.g., via a second error corrector 231 that may be local to the memory 230. The memory module 230 may include additional DRAMs 240, e.g., for chip spare, rank spare, and other redundancy/failsafe arrangements in the event of a failed DRAM 240.

The memory 230 may enable a two-level pre-fetch, e.g., based on an activate command and a read command. Such commands may be issued by the memory controller (e.g., controller 220 and/or first error corrector 210). An activate command may be issued to the memory 230 to read data out of a first memory array and into a second array (e.g., from a row array into a column array, and/or from the memory array 233 to the array of codewords 214). For example, a DDR4 memory 230 may read out 512 bytes of data, at one time, into the second array, as a first level of prefetch. The next level prefetch following the first level is associated with addressing the second array, and bringing out approximately 32 bits of data at a time with the example DDR4 memory. An on-die ECC of the second error corrector 231 may consider on the order of 128-bit correctable word entities (depending on specific memory vendor implementations), slightly complicating the second level 32-bit prefetch. More specifically, it is possible for an error 238 to be present somewhere in the four 32-bit segments that are associated with the 128 bits of the second error corrector 231. When performing a read from that prefetched area, the 128 bits of prefetched data may not reveal which of the four 32-bit segments had the error. Accordingly, in response to performing a read, an error (correctable or uncorrectable event) may be detected at a higher architectural level (i.e., by the memory controller first error corrector 210, corresponding to a platform ECC at a higher level than the on-die ECC). Thus, the first error corrector 210 may be called upon to reconstruct the entire 128-bit word to address the error 238, in contrast to reconstructing the specific 32-bit word containing the error 238.

Thus, memory 230 (such as DDR4) having a 2-level prefetch (e.g., in response to activate/prefetch commands) may be efficiently addressed by the present examples. The first level activate may implicate 4096 bits, and the second level may implicate an 8n prefetch (n being the data width) in preparation for a read command. However, neither of these (4096, 8n) may otherwise correspond to convenient word sizes to support embedded ECC by the second error corrector 231 at the memory 230. The 8n prefetch is likely to correspond to cache line sizes of earlier memory controllers. Accordingly, a prefetch ECC word value of 16n or 32n may be used by the first error corrector 210 of the present examples. The chosen value for the ECC word may thereby profoundly affect some memory controller functions, including memory scrubbing background reads that are performed to read and correct accumulated errors in the memory array 233. For example, efficiency may be increased dramatically. A prefetch based on an 8n word value may be associated with on the order of 12.5% overhead when performing single-bit error correction. In contrast, a prefetch based on a 32n word value consistent with the examples described herein may decrease needed overhead to, on the order of, 6% to 7%.

Improvements to prefetching and other accesses to the memory 230 may provide benefits during memory scrubbing operations. Memory scrubbing may be performed as a background/non-compute activity, where a memory controller (e.g., first error corrector 210 and/or second error corrector 231) may perform reads/accesses through the memory array 233. The memory controller(s) thereby may ensure that the stored data is in good condition, correcting any encountered errors as appropriate. More specifically, if the example first error corrector 210 encounters a correctable event at the platform/memory controller level, or if the example second error corrector 231 encounters an event that it cannot correct at a level of the on-die ECC, the first error corrector 210 may scrub memory areas associated with the detected error(s) (e.g., the four 32-bit prefetches as described above, regardless of which had the error) to recreate the appropriate data (e.g., the entire 128 bit portion). Thus, in view of this potential mismatch, between cacheline accesses by the first error corrector 210 and the correctable word within a DRAM 240 of the memory 230), the scrubbing routine (i.e., scrub stride length) may be modified to account for that difference.

In an example, the scrubbing routine may be modified as follows, including various conditions that are to be established and/or assumed to be established in some example systems 200: 1) The DRAM ECC correction capability, by the second error corrector 231, may be N random bits in a code word (second codeword 234) of W bits. 2) W=A*n bits, where A is an integer and n is the data width organization of the DRAM 240. 3) The memory 230 is capable of signaling an uncorrectable event (e.g., second error corrector 231 may provide indications 222, 224, 232 that an error 238 is uncorrectable). 4) Error correction checking by the memory 230 (second error corrector 231) can be turned off (the checking may be turned off independently of ECC generation), e.g., in response to indication 222. 5) The memory 230 may withhold attempts by the second error corrector 231 to correct the data, responsive to identifying that error 238 is uncorrectable by the second error corrector 231 (e.g., based on exceeding its error correction capability, such as too many random bit errors). 6) A platform error correction capability of the first error corrector 210 is capable of correcting N+1 random bits, or 4 random bits, whichever is larger, in a code word of $W_p$ bits, for a given architecture of the device 200. Thus, unlike previous memory controller designs, the first error corrector 210 and/or controller 220 may have improved capabilities and/or efficiencies, in view of working in conjunction with the second error corrector 231 at the memory 230.

Operation of the example device 200 may proceed as follows. The first error corrector 210 may increase its stride (length/interval) through the array 233, e.g., to at least match the ECC word size used by the second error corrector 231. Scrubbing, such as by an activate followed by a read to the appropriate column address of the memory 230, would thereby cover the data associated with the ECC word size, in the case that an error 238 is correctable by ECC of the DRAM second error corrector 231. Note that if the error 238 were to exceed the error correction capabilities of the DRAM ECC of the second error corrector 231, a probability might increase that the error 238 is a multi-symbol error. For example, if the second error corrector 231 ECC code were designed to correct two random bits within the code word, an uncorrectable error 238 would likely result in zero to three symbols being in error on a given access to the region covered by the ECC code word. Upon identifying/detecting that error 238 is uncorrectable by the second error corrector 231, the second error corrector 231 may provide error indication 232 to the controller 220. In response, the controller 220 may provide indication 222 to turn off DRAM ECC by the second error corrector 231. The controller 220 may then cause the first error corrector 210 to perform reads and correct error(s) within the region of the DRAM ECC word associated with error 238 (i.e., cause the first error corrector 210 to scrub the error region). In response to completion of the scrub, the controller 220 may provide third indication 224 to reestablish DRAM ECC by the second error corrector 231. Thus, the memory controller may operate more efficiently by relying on error correction by the second error corrector 231 when possible (within its capabilities), and by preventing the second error corrector 231 from interfering with scrubbing operations of the memory controller (e.g., when an error exceeds capabilities of the on-die ECC of the second error corrector 231).

Figure 3:
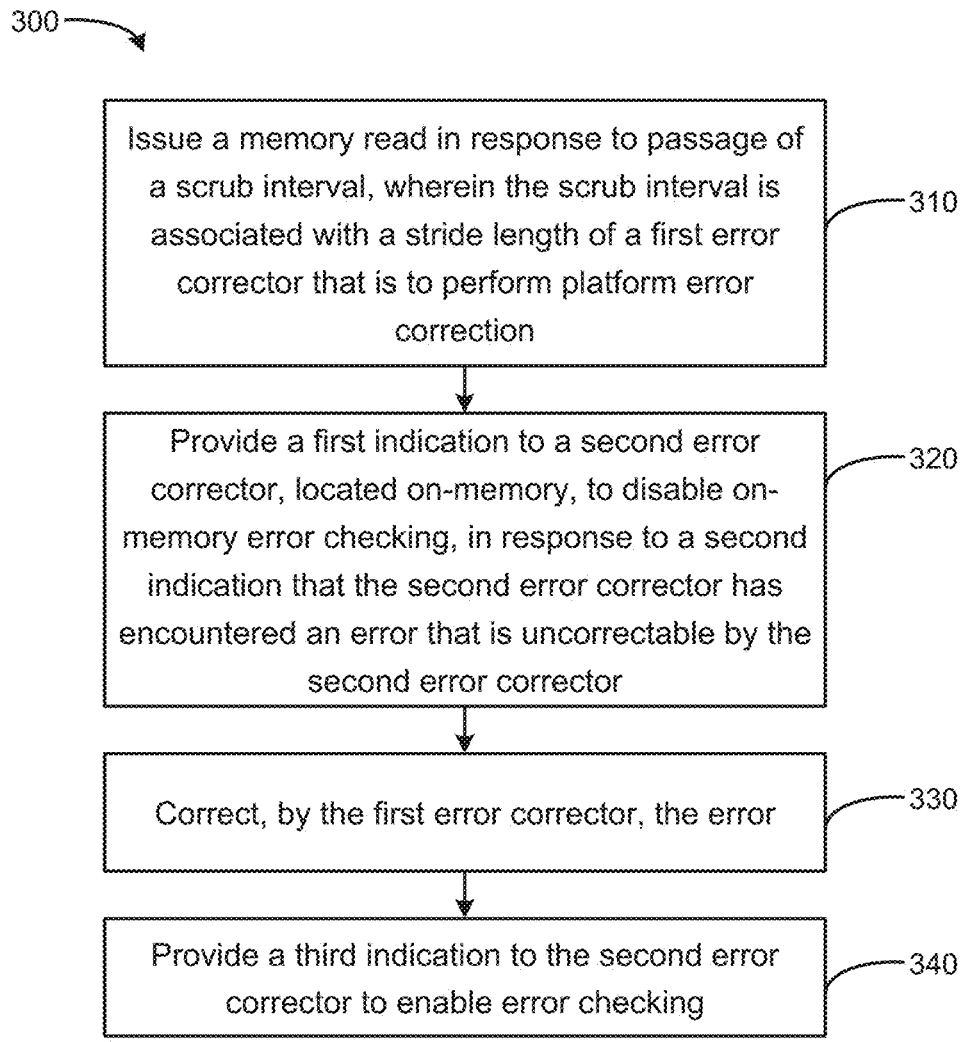
FIG. 3 is a flow chart based on correcting an error according to an example.
Figure 4:
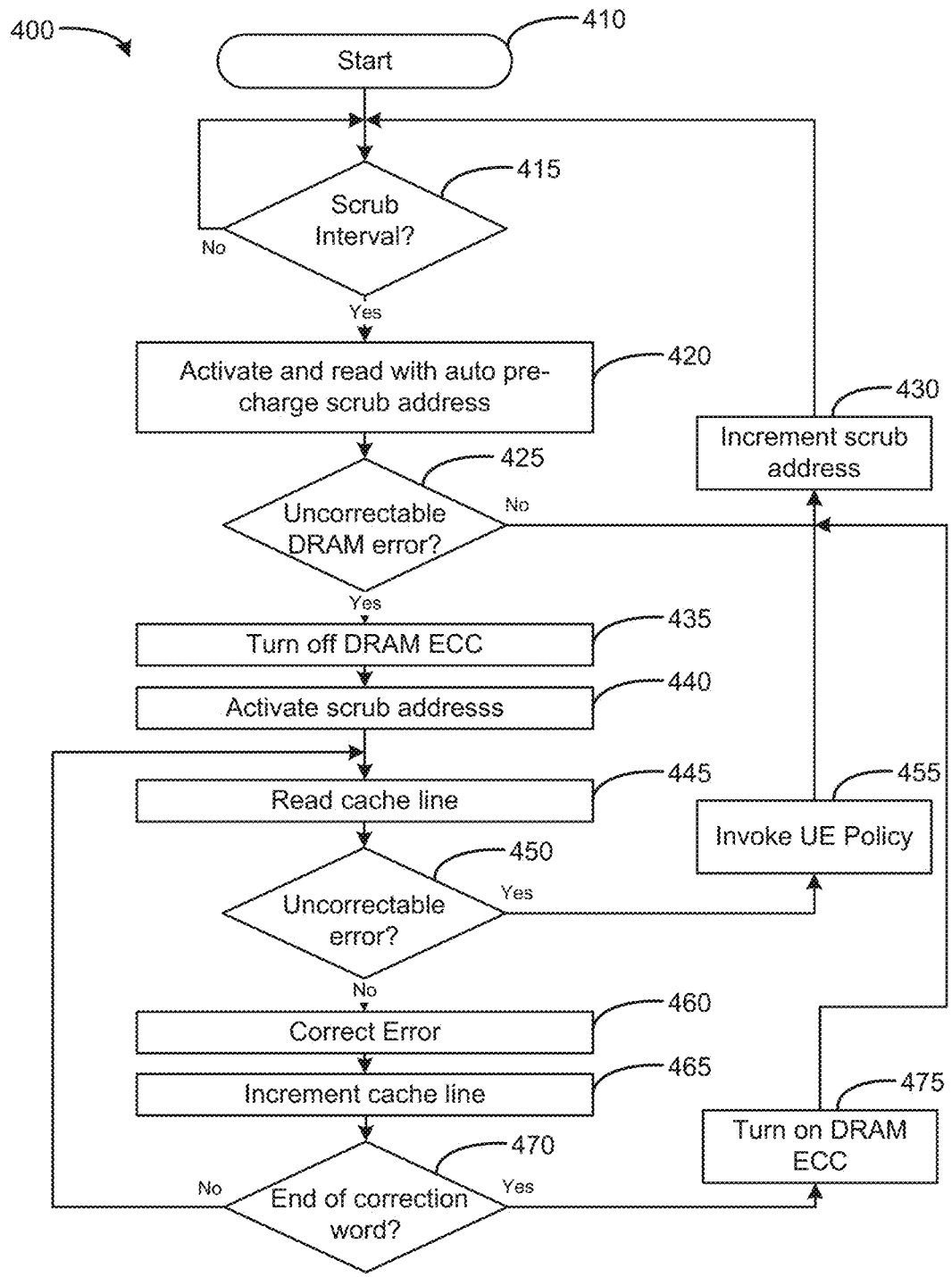
FIG. 4 is a flow chart based on correcting an error according to an example.

Referring to FIGS. 3 and 4, flow diagrams are illustrated in accordance with various examples of the present disclosure. The flow diagrams represent processes that may be utilized in conjunction with various systems and devices as discussed with reference to the preceding figures. While illustrated in a particular order, the disclosure is not intended to be so limited. Rather, it is expressly contemplated that various processes may occur in different orders and/or simultaneously with other processes than those illustrated.

FIG. 3 is a flow chart 300 based on correcting an error according to an example. In block 310, a memory read is issued in response to passage of a scrub interval, wherein the scrub interval is associated with a stride length of a first error corrector that is to perform platform error correction. For example, a platform error corrector may use a longer stride length for efficiency, reducing a frequency of scrubs and increasing a scrub interval for reduced overhead. The system may encounter an error in response to issuing the memory read at the scrub interval. In block 320, a first indication is provided to a second error corrector, located on-memory, to disable on-memory error checking, in response to a second indication that the second error corrector has encountered an error that is uncorrectable by the second error corrector. For example, an uncorrectable error at the DRAM has been detected, so the platform memory controller may provide the second indication to notify the system controller, and to turn off on-die DRAM ECC by the second error corrector in response to the first indication from the memory controller. The platform (first) error corrector may then perform memory scrubbing through those particular (e.g., four) addresses that are associated with what the DRAM is to prefetch, without a risk of the second error corrector performing its own modifications to the data that is to be addressed by the first error corrector. The error may be correctable or uncorrectable by the scrubbing by the first error corrector. If correctable, the first error corrector may write the correct data in memory and proceed to the next cacheline. Thus, in block 330, the first error corrector is to correct the error. If the error is uncorrectable by the first error corrector or the second error corrector, the system may invoke a policy for uncorrectable errors, such as halting the system and providing an indication to replace a memory module. In block 340, a third indication is provided to the second error corrector to enable error checking. For example, the platform memory controller may instruct the memory module to resume performing on-die error checking and/or correcting, enabling the platform error corrector to use a more efficient stride length for memory scrubbing.

FIG. 4 is a flow chart 400 based on correcting an error according to an example. Generally, the features depicted in flow chart 400 may relate to actions that may be carried out by a platform memory controller/error corrector. The following is a general overview of operations, which are to be described with more specific references to block numbers in a following paragraph. Generally, the memory controller may determine the scrub interval, and if the interval has passed (it is time to do a scrub), the memory controller activates the next page in the scrubbing sequence by performing a read with a precharge, which closes the page back out. The memory controller may check to determine whether there is an error, e.g., based on the memory reporting an error that is uncorrectable by the memory's ECC. If no error, then the platform memory controller may increment the scrub address and continue incrementing the scrub interval toward the next scrub. If the DRAM has reported an uncorrectable error, the memory controller may turn off the DRAM ECC, and re-activate the cacheline. The memory controller also may interact with associated services, such as by logging a correctable error, an information invoke, or an uncorrectable error. If the error is uncorrectable by the platform memory controller, the memory controller may log that policy and proceed. If the error is correctable by the platform memory controller, the error may be logged as desired, and the platform memory controller may perform the error correction, such as by incrementing the cacheline until reaching the end of the codeword. The platform memory controller may then turn on the DRAM ECC, and resume normal operation.

More specifically, with reference to particular block numbers in FIG. 4, flow starts in block 410. In block 415, it is determined whether a scrub interval has elapsed. If not, flow loops to the start 410 to allow passage of time. Upon passage of a scrub interval, flow proceeds to block 420. In block 420, an auto precharge scrub address is activated and read. In block 425, it is determined whether an uncorrectable DRAM error has occurred. If not, flow proceeds to block 430. In block 430, a scrub address is incremented, and flow returns to the start 410. If, at block 425, an uncorrectable DRAM error was identified, then flow proceeds from block 425 to block 435. In block 435, DRAM ECC is turned off. In block 440, a scrub address is activated. In block 445, a cache line is read. In block 450, it is determined whether an uncorrectable error is identified. If yes, flow proceeds to block 455. In block 455, an uncorrectable error (UE) policy is invoked. Flow proceeds to block 430 and back to start 410, as set forth above. If, in block 450, an uncorrectable error is not identified, then flow proceeds to block 460. In block 460, the error is corrected. In block 465, the cache line is incremented. In block 470, it is determined whether an end of the correction word is identified. If not, flow proceeds to block 445 to proceed as set forth above. If, at block 470, an end of correction word is identified, flow proceeds to block 475. At block 475, DRAM ECC is turned on, and flow proceeds to block 430 to proceed as set forth above.

As referenced above, information may be logged. Such logged information may be referenced by the system (e.g., by software, such as an operating system associated with example devices/systems). For example, if the system logs a threshold number of errors, the system may take additional decisions for repair, such as invoking chip spare or rank spare, and so on. Such logging steps may be included in the flowcharts of FIGS. 3 and 4, but have been omitted in the drawings for visual clarity.

Examples provided herein may be implemented in hardware, software, or a combination of both. Example systems can include a processor and memory resources for executing instructions stored in a tangible non-transitory medium (e.g., volatile memory, non-volatile memory, and/or computer readable media). Non-transitory computer-readable medium can be tangible and have computer-readable instructions stored thereon that are executable by a processor to implement examples according to the present disclosure.

Figure 5:
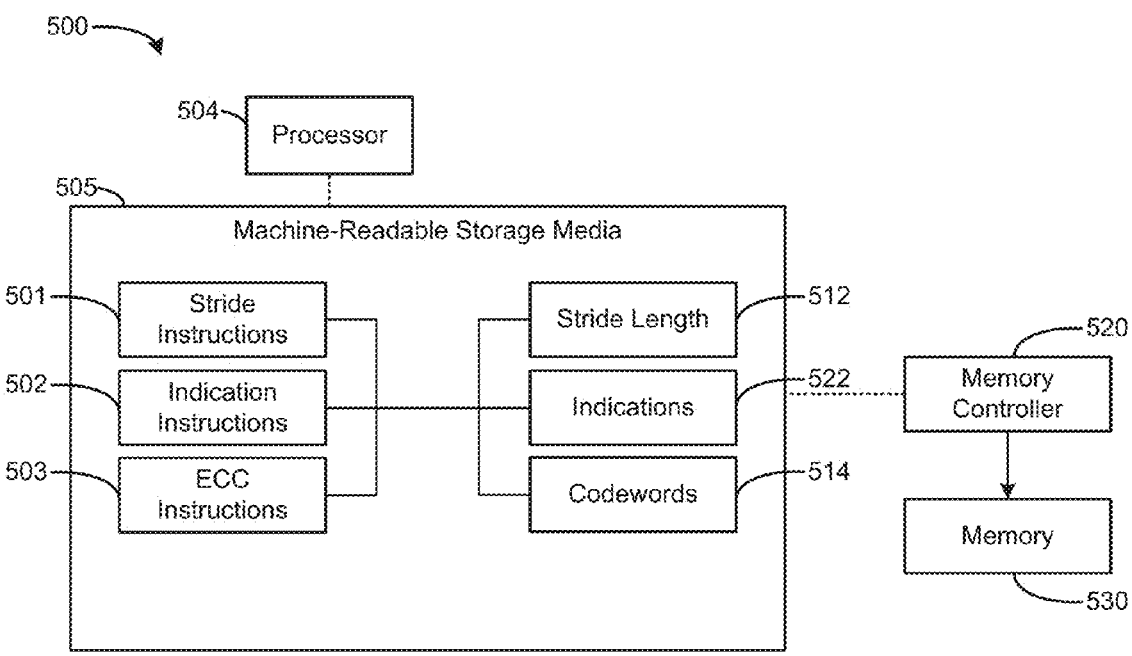
FIG. 5 is a block diagram of a system including a plurality of instructions according to an example.

FIG. 5 is a block diagram of a system 500 including a plurality of instructions 501-503 according to an example. The system 500 also includes a processor 504, machine-readable media 505, a memory controller 520, and memory 530. The machine-readable media 505 is associated with stride instructions 501, indication instructions 502, ECC instructions 503, stride length 512, indications 522, and codewords 514. In an example, various instructions (including instructions 501-502) may use various values (including stride length 512, indications 522, and codewords 514) to cause the memory controller 520 to interact with the memory 530 consistent with the various examples described herein and with reference to examples consistent with FIGS. 1-4. In some examples, instructions 501-503 may correspond to aspects of devices 100, 200 of FIGS. 1, 2, and may correspond to the flow charts of FIGS. 3, 4. Thus, operations performed when instructions 501-503 are executed by processor 504 may correspond to such functionality. The machine-readable storage media 505 is encoded with instructions 501-503 executable by processor 504. In some examples, storage media 505 may include additional instructions and/or variables. In some examples, instructions 501-503, and any other instructions described herein (e.g., those instructions of flow charts of FIGS. 3, 4) in relation to storage media 505, may be stored on a machine-readable storage media that is remote from and accessible (e.g., via a computer network) to system 500 and processor 504. In some examples, instructions 501-503 may be instructions of a computer program, computer application ("app"), agent, or the like, of system 500.

In examples described herein, the term "processor" may include a processing resource such as, for example, one processor or multiple processors included in a single computing device or distributed across multiple computing devices. The term processor also may be at least one of a central processing unit (CPU), a semiconductor-based microprocessor, a graphics processing unit (GPU), a field-programmable gate array (FPGA) configured to retrieve and execute instructions, an application-specific integrated circuit (ASIC), and/or other electronic circuitry suitable for the retrieval and execution instructions stored on a machine-readable storage media, or a combination thereof. Processor 504 may fetch, decode, and execute instructions stored on storage media 505 to perform the functionalities described herein. In other examples, the functionalities of any of the instructions of storage media 505 may be implemented in the form of electronic circuitry, in the form of executable instructions encoded on a machine-readable storage media, or a combination thereof.

As used herein, a "machine-readable storage media" may be any electronic, magnetic, optical, or other physical storage apparatus to contain or store information such as executable instructions, data, and the like. For example, any machine-readable storage media described herein may be any of Random Access Memory (RAM), volatile memory, non-volatile memory, flash memory, phase-change memory, memristor-based memory, a storage drive (e.g., a hard drive), a solid state drive, any type of storage disc (e.g., a compact disc, a DVD, etc.), and the like, or a combination thereof. Further, any machine-readable storage media described herein may be non-transitory.

Thus, an example system (e.g., a computing device) can include and/or receive a tangible non-transitory computer-readable medium storing a set of computer-readable instructions (e.g., software). As used herein, the processor can include one or a plurality of processors such as in a parallel processing system. The memory can include memory addressable by the processor for execution of computer readable instructions. The computer readable medium can include volatile and/or non-volatile memory such as a random access memory ("RAM"), magnetic memory such as a hard disk, floppy disk, and/or tape memory, a solid state drive ("SSD"), flash memory, phase change memory, and so on.

The various illustrative components, modules, and blocks described in connection with the examples disclosed herein may be implemented as electronic hardware, computer software, or combinations of both. Thus, the example blocks of FIGS. 1-5 may be implemented using software modules, hardware modules or components, or a combination of software and hardware modules or components. In another example, one or more of the blocks of FIGS. 1-5 may comprise software code stored on a computer readable storage medium, which is executable by a processor. As used herein, the indefinite articles "a" and/or "an" can indicate one or more than one of the named object. Thus, for example, "a processor" can include one or more than one processor, such as in a multi-core processor, cluster, or parallel processing arrangement. The processor may be any combination of hardware and software that executes or interprets instructions, data transactions, codes, or signals. For example, the processor may be a microprocessor, an Application-Specific Integrated Circuit ("ASIC"), a distributed processor such as a cluster or network of processors or computing device, or a virtual machine. The processor may be coupled to memory resources, such as, for example, volatile and/or non-volatile memory for executing instructions stored in a tangible non-transitory medium. The non-transitory machine-readable storage medium can include volatile and/or non-volatile memory such as a random access memory ("RAM"), magnetic memory such as a hard disk, floppy disk, and/or tape memory, a solid state drive ("SSD"), flash memory, phase change memory, and so on.

The computer-readable medium may have computer-readable instructions stored thereon that are executed by the processor to cause a system (e.g., a rate limit manager to direct hardware rate limiters) to implement the various examples according to the present disclosure.

What is claimed is:

1. A device comprising:
a first error corrector to perform platform error correction based on striding through a memory array of a memory according to a stride length, wherein the device is to interface with the memory that includes a second error corrector that is to perform on-memory error correction;
a controller interfaced with the first error corrector to provide a disable indication to the second error corrector to turn off error checking, in response to an error indication by the second error corrector of encountering an error that is uncorrectable by the second error corrector, wherein the first error corrector is to correct the error using platform error correction, and wherein the controller is to provide an enable indication to the second error corrector to turn on error checking;
wherein the stride length of the first error corrector is greater than a first codeword size of a cacheline of the platform error correction, and wherein the stride length is to correspond to a multiple of a second codeword size of the on-memory error correction of the second error corrector; and
wherein, in response to the error indication, the first error corrector is to reduce the stride length, and perform a detailed scrub to isolate a location of the error within the cacheline.

2. The device of claim 1, wherein the stride length does not fall along cacheline boundaries of a cacheline of the memory.

3. The device of claim 1, wherein the platform error correction includes a capability of correcting four random bits.

4. The device of claim 1, wherein the platform error correction includes a capability of correcting N+1 random bits, where N is a number of random bits of the on-memory error correction capability.

5. The device of claim 1, wherein the first error corrector is to correct the error based on a region of the second codeword of the on-memory error correction of the second error corrector.

6. The device of claim 1, wherein the first error corrector is to scrub a memory location according to a scrub address, and iteratively increment the scrub address based on the stride length, in response to not encountering an error during a scrub interval.

7. The device of claim 1, wherein the device is to interface with a double data rate fourth generation synchronous dynamic random-access memory (DDR4 SDRAM) module including on-memory error correction code (ECC) capability.

8. The device of claim 1, wherein the stride length corresponds to skipping errors that are within a capability of the on-memory error correction of the second error corrector.

9. The device of claim 1, wherein the stride length used by the first error corrector is sized relative to a first codeword of the first error corrector.

10. The device of claim 1, wherein the stride length used by the second error corrector is sized relative to a second codeword of the second error corrector.

11. A method, comprising:
issuing, by a controller, a memory read in response to passage of a scrub interval, wherein the scrub interval is associated with a stride length of a first error corrector that is to perform platform error correction;
providing, by the controller, a disable indication to a second error corrector, located on-memory, to disable on-memory error checking, in response to an error indication that the second error corrector has encountered an error that is uncorrectable by the second error corrector in carrying out the memory read issued by the controller;
correcting, by the first error corrector, the error;
providing, by the controller, an enable indication to the second error corrector to enable error checking; and
reducing the stride length in response to the error indication, and performing a detailed scrub to isolate a location of the error within a cacheline of the platform error correction.

12. The method of claim 11, further comprising restoring the stride length to its value prior to reducing the stride length, in response to providing the enable indication, wherein the first error corrector is to perform the scrub based on the restored stride length.

13. The method of claim 11, further comprising iteratively issuing the memory read to a plurality of memory addresses based on incrementing a memory address to be read for an iteration.

14. The method of claim 11, wherein the stride length used by the first error corrector is sized relative to a first codeword of the first error corrector.

15. The method of claim 11, wherein the stride length used by the second error corrector is sized relative to a second codeword of the second error corrector.

16. A non-transitory machine-readable storage medium encoded with instructions executable by a computing system that, when executed, cause the computing system to:
stride through a memory array of a memory according to a stride length of a first error corrector to perform platform error correction;
provide a disable indication, to turn off error checking at a second error corrector that is to perform on-memory error correction of the memory, in response to receiving an error indication by the second error corrector of encountering an error that is uncorrectable by the second error corrector;
correct the error by the first error corrector using platform error correction;
provide an enable indication to the second error corrector to turn on error checking;
wherein the stride length of the first error corrector is greater than a length of a first codeword size of a cacheline of the platform error correction, and wherein the stride length is to correspond to a multiple of a second codeword size of the on-memory error correction of the second error corrector; and
further comprising instructions that cause the computing system to reduce the stride length, in response to the error indication, and perform a detailed scrub to isolate a location of the error within the cacheline.

17. The non-transitory machine-readable storage medium of claim 16, wherein the stride length used by the first error corrector is sized relative to a first codeword of the first error corrector.

18. The non-transitory machine-readable storage medium of claim 16, wherein the stride length used by the second error corrector is sized relative to a second codeword of the second error corrector.

* * * * *